US011761559B2

(12) United States Patent
Vaccaro et al.

(10) Patent No.: US 11,761,559 B2
(45) Date of Patent: Sep. 19, 2023

(54) DEVICES AND METHODS FOR HOLDING CABLES WITH NON-UNIFORM UNDULATIONS

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 52 days.

(21) Appl. No.: 17/381,793

(22) Filed: Jul. 21, 2021

(65) Prior Publication Data

US 2022/0112970 A1   Apr. 14, 2022

Related U.S. Application Data

(60) Provisional application No. 63/091,574, filed on Oct. 14, 2020.

(51) Int. Cl.
*F16L 3/137* (2006.01)
*F16L 3/233* (2006.01)
(Continued)

(52) U.S. Cl.
CPC .............. *F16L 3/137* (2013.01); *F16L 3/2235* (2013.01); *F16L 3/2332* (2013.01); *H02G 3/32* (2013.01)

(58) Field of Classification Search
CPC ....... F16L 3/137; F16L 3/2235; F16L 3/2332; F16L 33/035; F16L 33/03; H02G 3/32;
(Continued)

(56) References Cited

U.S. PATENT DOCUMENTS

| 931,706 A | * | 8/1909 | Stevens ..................... F16B 2/08 403/283 |
| 3,054,585 A | | 9/1962 | Roberts et al. |

(Continued)

FOREIGN PATENT DOCUMENTS

| EP | 1813479 A1 * | 8/2007 | ......... B60R 16/0215 |
| WO | 2018111513 A1 | 6/2018 | |

OTHER PUBLICATIONS

"International Search Report and Written Opinion corresponding to International Application No. PCT/US2021/043158 dated Nov. 16, 2021".

(Continued)

*Primary Examiner* — Eret C McNichols
(74) *Attorney, Agent, or Firm* — Myers Bigel, P.A.

(57) ABSTRACT

A device adapted for holding one or more discrete cables includes: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion; a securing feature attached to or integral with the mounting portion of the main body and configured to be secured to a mounting structure; and a plurality of apertures along the longitudinal axis of the wrapping portion of the main body. The securing feature is configured to be received through one of the plurality of apertures when the main body is wrapped around the one or more discrete cables. At least one of the undulations varies in height, width and/or thickness from at least one of the other undulations.

18 Claims, 8 Drawing Sheets

(51) Int. Cl.
*F16L 3/223* (2006.01)
*H02G 3/32* (2006.01)

(58) Field of Classification Search
CPC ............ B65D 63/1018; B65D 63/1027; B65D 63/109; B65D 63/10; B65D 63/1063; B65D 63/1072; B65D 63/1081
See application file for complete search history.

(56) References Cited

U.S. PATENT DOCUMENTS

| | | | |
|---|---|---|---|
| 3,088,702 A | | 5/1963 | Orenick et al. |
| 3,189,961 A | * | 6/1965 | Heller .................. F16L 33/035 24/20 CW |
| 3,550,219 A | | 12/1970 | Buren |
| 4,001,898 A | | 1/1977 | Caveney |
| 4,235,404 A | * | 11/1980 | Kraus ..................... F16L 3/233 248/74.3 |
| 4,261,539 A | | 4/1981 | Albern et al. |
| 4,402,113 A | * | 9/1983 | Smith ..................... F16L 33/02 24/23 R |
| 4,573,242 A | | 3/1986 | Lankton et al. |
| 4,728,064 A | | 3/1988 | Caveney |
| 4,860,979 A | | 8/1989 | Camenisch |
| 4,919,682 A | * | 4/1990 | Bellazzi ................ F16L 33/035 24/20 R |
| 5,706,558 A | * | 1/1998 | Sauer ..................... F16L 33/02 24/271 |
| 5,878,465 A | * | 3/1999 | Jenner .................. H02G 3/0468 24/271 |
| D424,921 S | * | 5/2000 | Axelsson ............. F16L 33/035 D8/394 |
| D426,458 S | * | 6/2000 | Axelsson ................ F16L 33/02 D8/394 |
| 6,581,885 B2 | * | 6/2003 | Polad ...................... F16L 3/137 248/205.3 |
| 6,935,001 B2 | * | 8/2005 | Barriuso ............... F16L 3/2334 24/17 AP |
| 9,306,380 B2 | | 4/2016 | Vaccaro |
| 9,630,758 B2 | * | 4/2017 | Kozminske ........ B65D 63/1027 |
| 9,672,955 B2 | | 6/2017 | Doushita et al. |
| 9,866,004 B2 | | 1/2018 | Vaccaro et al. |
| 9,903,510 B2 | | 2/2018 | Joshi et al. |
| 10,479,573 B2 | * | 11/2019 | Winter ................ B65D 63/1081 |
| 10,604,317 B2 | * | 3/2020 | Chmelar ............. B65D 63/1027 |
| 10,717,572 B2 | * | 7/2020 | Wiles ................. B65D 63/1072 |
| 10,760,715 B1 | * | 9/2020 | Livingston ............... H02G 3/32 |
| 10,994,906 B2 | * | 5/2021 | Chmelar ............. B65D 63/1027 |
| 11,268,635 B2 | * | 3/2022 | Vaccaro ................ F16L 3/1058 |
| 11,271,378 B2 | * | 3/2022 | Vaccaro ................ H02G 3/0456 |
| 11,313,492 B2 | * | 4/2022 | Siragusa ................. F16L 3/233 |
| 11,344,706 B2 | | 5/2022 | Roy et al. |
| 2003/0029972 A1 | | 2/2003 | Rodgers |
| 2013/0174584 A1 | | 7/2013 | Stemmle et al. |
| 2016/0020000 A1 | | 1/2016 | Doushita et al. |
| 2016/0271868 A1 | | 9/2016 | Ono |
| 2017/0050786 A1 | * | 2/2017 | Kozminkse ........ B65D 63/1027 |
| 2019/0119018 A1 | * | 4/2019 | Chmelar ............. B65D 63/1072 |
| 2020/0220339 A1 | | 7/2020 | Vaccaro et al. |
| 2021/0338989 A1 | | 11/2021 | Roy et al. |
| 2022/0340341 A1 | | 10/2022 | Mangiameli |

OTHER PUBLICATIONS

"International Search Report and Written Opinion corresponding to International Application No. PCT/US2023/018020 dated Jul. 31, 2023".

* cited by examiner

DEVICES AND METHODS FOR HOLDING CABLES WITH NON-UNIFORM UNDULATIONS

RELATED APPLICATION

The present application claims priority from and the benefit of U.S. Provisional Patent Application No. 63/091,574, filed Oct. 14, 2020, the disclosure of which is hereby incorporated herein by reference in full.

FIELD

The present invention relates to devices and methods for holding cables.

BACKGROUND

Currently, there a variety of metallic (e.g., stainless steel) cable hangers that are used to hold or bundle and secure cables to the top of telecommunications towers, such as, for example, U.S. Pat. No. 9,306,380 to Vaccaro, U.S. Pat. No. 9,866,004 to Vaccaro et al., and U.S. Pat. No. 9,903,510 to Joshi, each of which are incorporated herein by reference in their entireties. However, the use of metal components near an antenna on cell sites can be a source of unwanted passive intermodulation (PIM) in the modern radio frequency (RF) environment. There may be a need for non-metallic, non-magnetic cable hangers for cables used in small cell telecommunications towers that reduce costs and allow for easy installation, while alleviating technical performance concerns, such as, PIM.

SUMMARY

As a first aspect, embodiments of the invention are directed to a device adapted for holding one or more discrete cables. The device comprises: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion; a securing feature attached to or integral with the mounting portion of the main body and configured to be secured to a mounting structure; and a plurality of apertures along the longitudinal axis of the wrapping portion of the main body. The securing feature is configured to be received through one of the plurality of apertures when the main body is wrapped around the one or more discrete cables. At least one of the undulations varies in height, width and/or thickness from at least one of the other undulations.

As a second aspect, embodiments of the invention are directed to a device adapted for holding one or more discrete cables comprising: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion; a securing feature attached to or integral with the mounting portion of the main body and configured to be secured to a mounting structure; and a plurality of apertures along the longitudinal axis of the wrapping portion of the main body. The securing feature is configured to be received through one of the plurality of apertures when the main body is wrapped around the one or more discrete cables. A first one of the plurality of undulations is immediately adjacent to the mounting portion, and wherein the first undulation varies in height and width from at least one of the other undulations.

As a third aspect, embodiments of the invention are directed to a device adapted for holding one or more discrete cables comprising: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion; a securing feature attached to or integral with the mounting portion of the main body and configured to be secured to a mounting structure; and a plurality of apertures along the longitudinal axis of the wrapping portion of the main body. The securing feature is configured to be received through one of the plurality of apertures when the main body is wrapped around the one or more discrete cables. A first one of the plurality of undulations is immediately adjacent to the mounting portion and has a first height, a second undulation is immediately adjacent the first undulation and has a second height, and a third undulation is immediately adjacent the second undulation and has a third height, and wherein the third height is greater than the second height, and the second height is greater than the first height.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a device adapted for holding one or more discrete cables is illustrated in FIGS. 1A-1D and designated broadly at 400. The device 400 (which is described in detail in U.S. Patent Publication No. 2020/0220339, and which is incorporated by reference herein in full) comprises a flexible main body 402, a securing feature 404, and a plurality of apertures 406. The main body 402 is flexible and configured to be wrapped such that the main body 402 can circumscribe one or more discrete cables 130. The main body 402 of the device 400 has a wrapping portion 402a and a mounting portion 402b. The securing feature 404 of device 400 is attached to or integral with the mounting portion 402b of the main body 402 and is configured to be secured to a mounting structure, such as a telecommunications tower, cable hanger adapter, or monopole. In the illustrated embodiment, the securing feature 404 comprises two barbs 404a separated by a cavity 420. Each barb 404a is configured to be received by a respective aperture 406 in the wrapping portion 402a of the main body 402 of the device 400. The cavity 420 is configured to receive a section (or "rib") 408 of the main body 402 located between each aperture 406. For example, when holding or bundling together one or more discrete cables, as each barb 404a of the securing feature 404 is inserted through a respective aperture 406, the rib 408 between each aperture 406 is received within the cavity 420. The barbs 404a (i.e., the securing feature 404) may then be secured to a mounting structure, thereby securing the rib 408 within the cavity 420.

Between the wrapping portion 402a and the mounting portion 402b, the device 400 comprises a plurality of undulations 407 (in the illustrated embodiment, three undulations are present). The undulations 407 may contribute to the flexibility of the device 400 (both in bending and in elongation) to help the wrapping portion 402a to circumscribe one or more discrete cables.

Figure 1A:
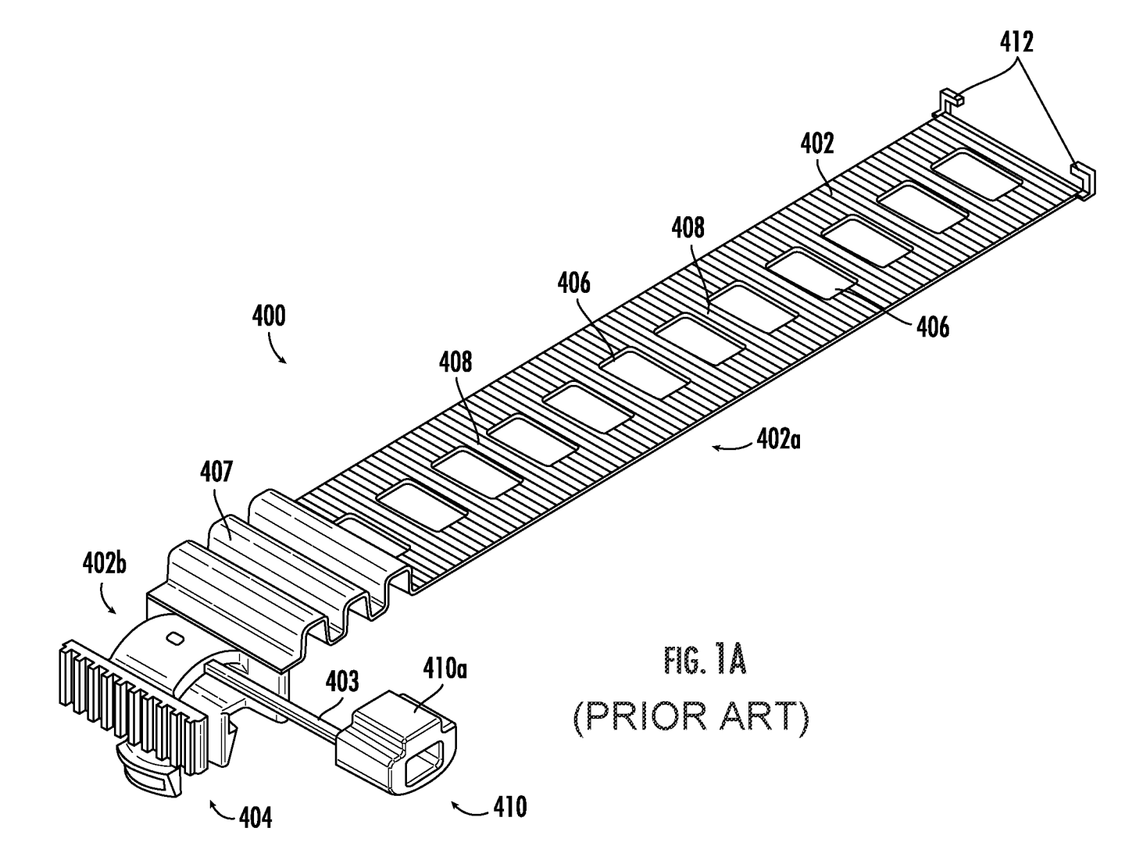
FIG. 1A is a front perspective view of a device adapted for holding one or more discrete cables.
Figure 1B:
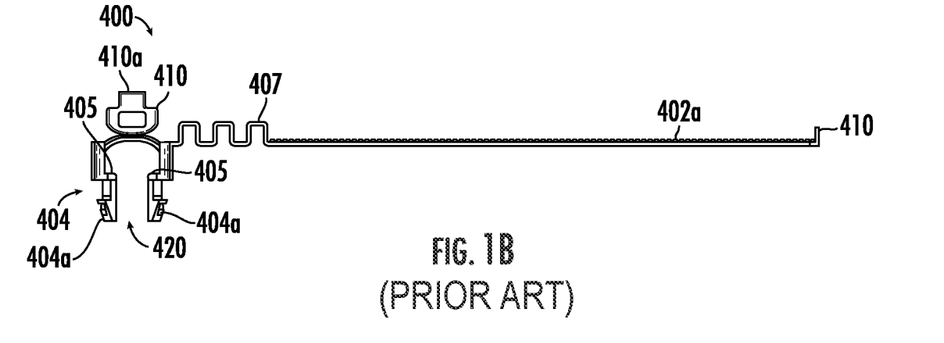
FIG. 1B is a side view of the device of FIG. 1A.
Figure 1C:
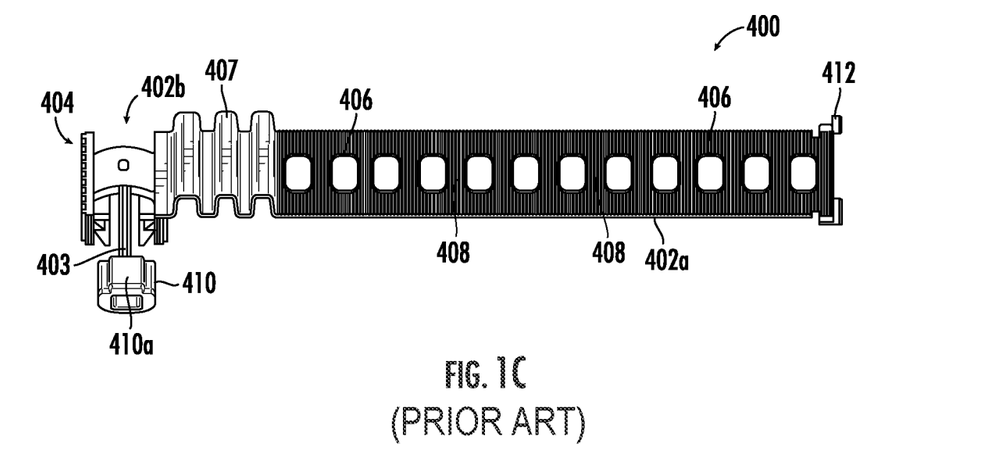
FIG. 1C is a top view of the device of FIG. 1A.
Figure 1D:
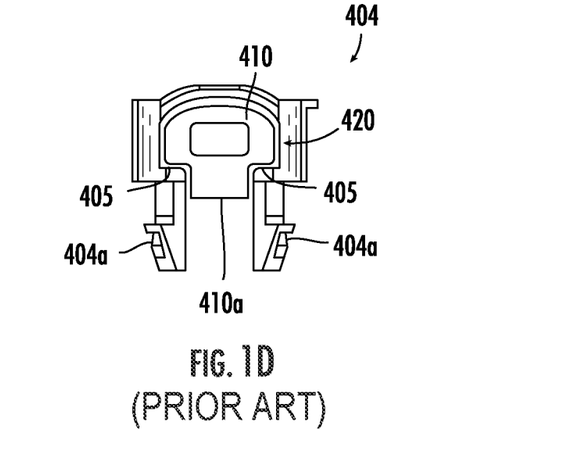
FIG. 1D is an enlarged side view of the securing feature of the device of FIG. 1A with the plug inserted into the cavity of the securing feature.

It has been observed that the most common location for fracture or failure of the device when "wrapped" around a bundle of cables is the undulation that is positioned nearest the mounting portion 402. Investigation has also indicated that the individual undulations 407 in the device 400 may undergo different levels of stress when wrapped around cables. Thus, it may be desirable to provide a design that can improve the degree of elongation (which enables the device to be used with a greater variety of sizes and combinations of cables) and the ability of the device to resist cracking.

The device shown in FIGS. 2-5 and designated broadly at 100 can indeed provide performance benefits as described. The device 100 includes a flexible main body 102 having a wrapping portion 102a and a mounting portion 102b, a securing feature 104 in the form of two opposed latches extending from the mounting portion 102b, and a plurality of apertures 106. Five serially merging undulations 107a-e are present between the mounting portion 102b and the wrapping portion 102a.

Figure 2:
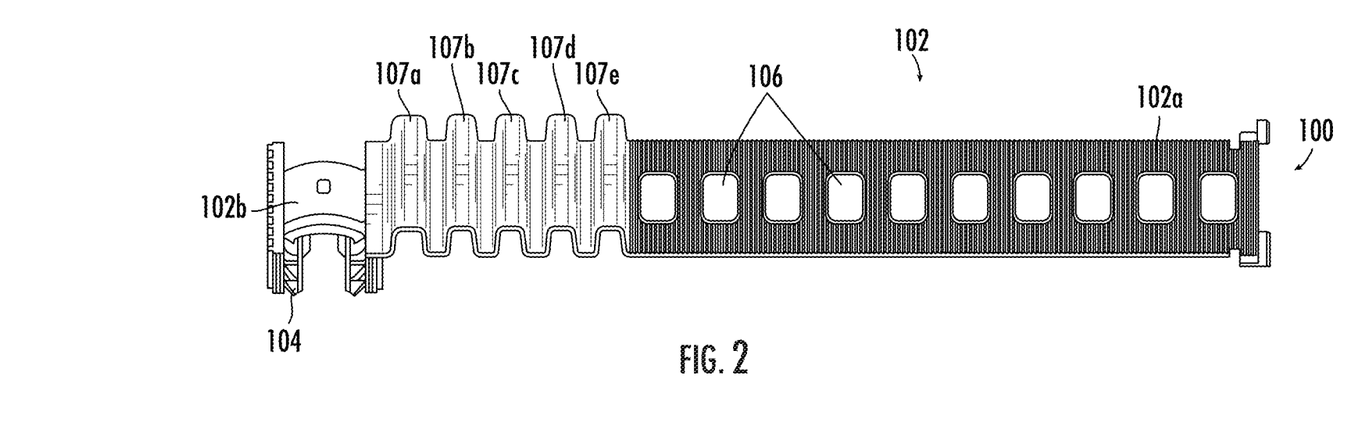
FIG. 2 is a side perspective view of a device for hanging cable bundles according to embodiments of the invention.
Figure 3:
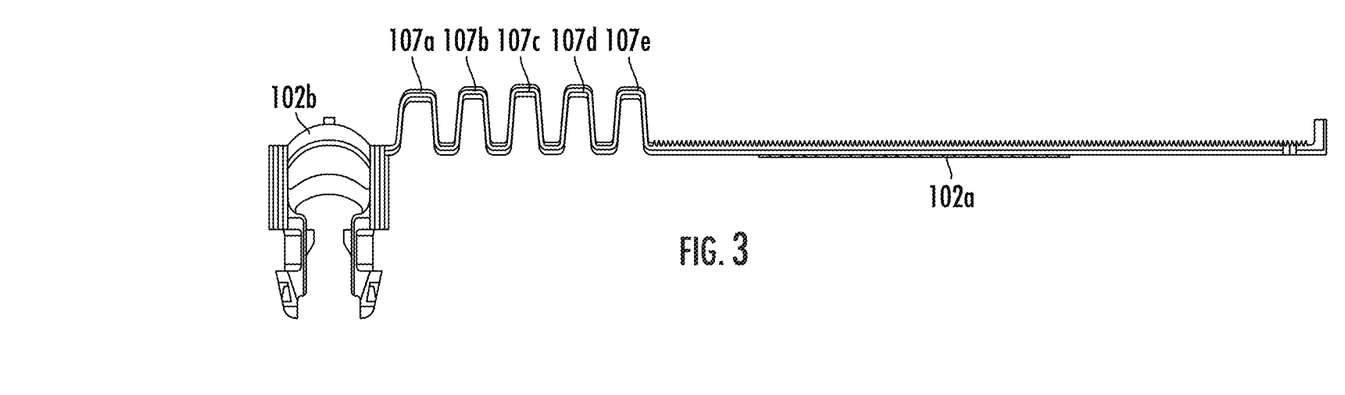
FIG. 3 is a side view of the device of FIG. 2.
Figure 4:
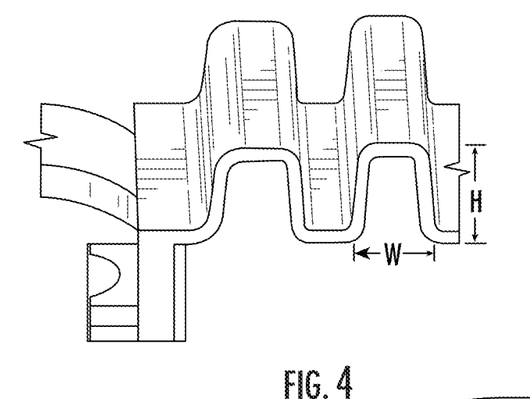
FIG. 4 is an enlarged partial perspective view of two of the undulations of the device of FIG. 2.

As discussed above, the undulations 107a-e can provide elongation and flexibility to the device 100 when it is stretched and wrapped around one or more cables for mounting thereof to a mounting structure. Testing and observation have revealed that in many instances, the undulation nearest the mounting portion 102b (in this instance the undulation 107a) and the undulation nearest the wrapping portion 102a (in this instance the undulation 107e) experience the highest levels of stress under the load caused by wrapping.

To combat this issue, the device 100 has non-uniform undulations 107a-e. More specifically, the undulation 107a nearest the mounting portion 102a has a height H (measured from root to crest—see FIG. 4) that is less than the height of the adjacent undulation 107b. The undulation 107b is shorter in height than the adjacent undulation 107c. The undulation 107c and 107d are of the same height, but undulation 107e (the undulation nearest the wrapping portion 102a) is shorter in height than the adjacent undulation 107d.

In addition, the undulation 107a has a width W (measured from root to root—see again FIG. 4) that that is greater than the remaining undulations 107b-e, which in this embodiment all have the same width.

Figure 5:
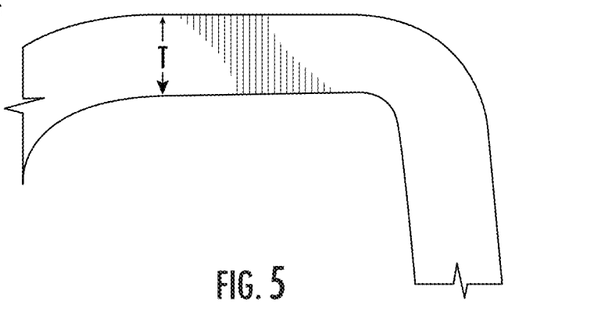
FIG. 5 is a greatly enlarged partial side view of a portion of the first undulation of the device of FIG. 2.

Also, it can be seen in FIG. 5 that the undulation 107a varies in thickness T (with the thickness T of the undulations being the wall thickness of the undulation as shown in FIG. 5). More specifically, the "vertical run" of the undulation 107a nearest the mounting portion 102b has a greater thickness T than the "vertical run" of the undulation 107a that merges with the undulation 107b, and that thickness tapers from larger to smaller over the "horizontal run" of the undulation 107a that spans the aforementioned "vertical runs." The remaining undulations 107b-e have the same thickness as that of the vertical run of undulation 107a that merges with undulation 107b.

Performance advantages provided by the device 100 can be understood by reference to FIGS. 6-9. Simulating loading analyses were conducted on the device 100 as compared to the device 400 illustrated above. Specifically, the device 400 analyzed had three undulations 407, which were uniform in height (3.8 mm), width (6.34 mm) and thickness (1.2 mm). In contrast, the device 100 analyzed had five undulations, the dimensions are which are shown in Table 1.

TABLE 1

Dimensions of Device 100

| Undulation | Height H (mm) | Width W (mm) | Thickness T (mm) |
|---|---|---|---|
| 107a | 5.40 | 6.34 | 1.40 tapering to 1.20 |
| 107b | 5.80 | 6.34 | 1.20 |
| 107c | 6.10 | 6.34 | 1.20 |
| 107d | 6.10 | 6.34 | 1.20 |
| 107e | 5.80 | 6.34 | 1.20 |

Figure 6A:
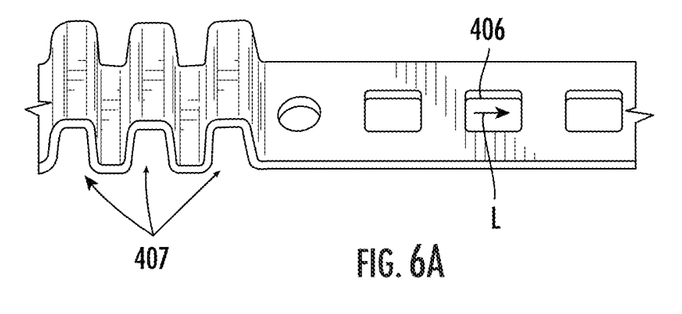
FIGS. 6A and 6B are partial side perspective views of the device of FIG. 2 illustrating how the load and constraints were applied during load modeling of the device.
Figure 6B:
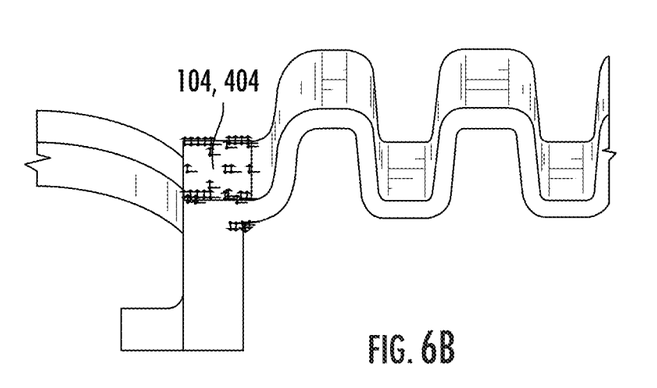

Three-dimensional CAD models were built of the devices 100, 400. Finite Element Analysis was then performed on the models, with a simulated load L of 5 lb. being applied to the third aperture 106, 406 from the undulations (see FIG. 6A) as the mounting portions 104, 404 were constrained (FIG. 6B).

Figure 7:
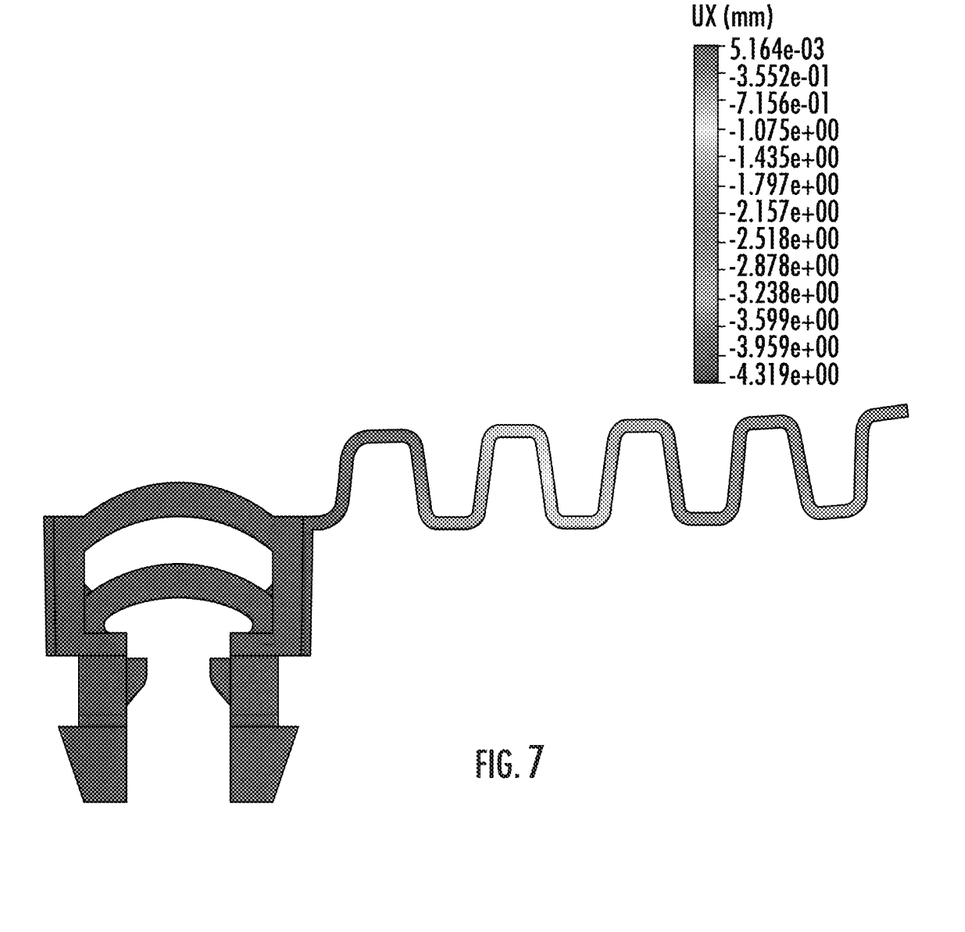
FIG. 7 is a plot illustrating elongation of the device of FIG. 2 under load modeling.
Figure 8:
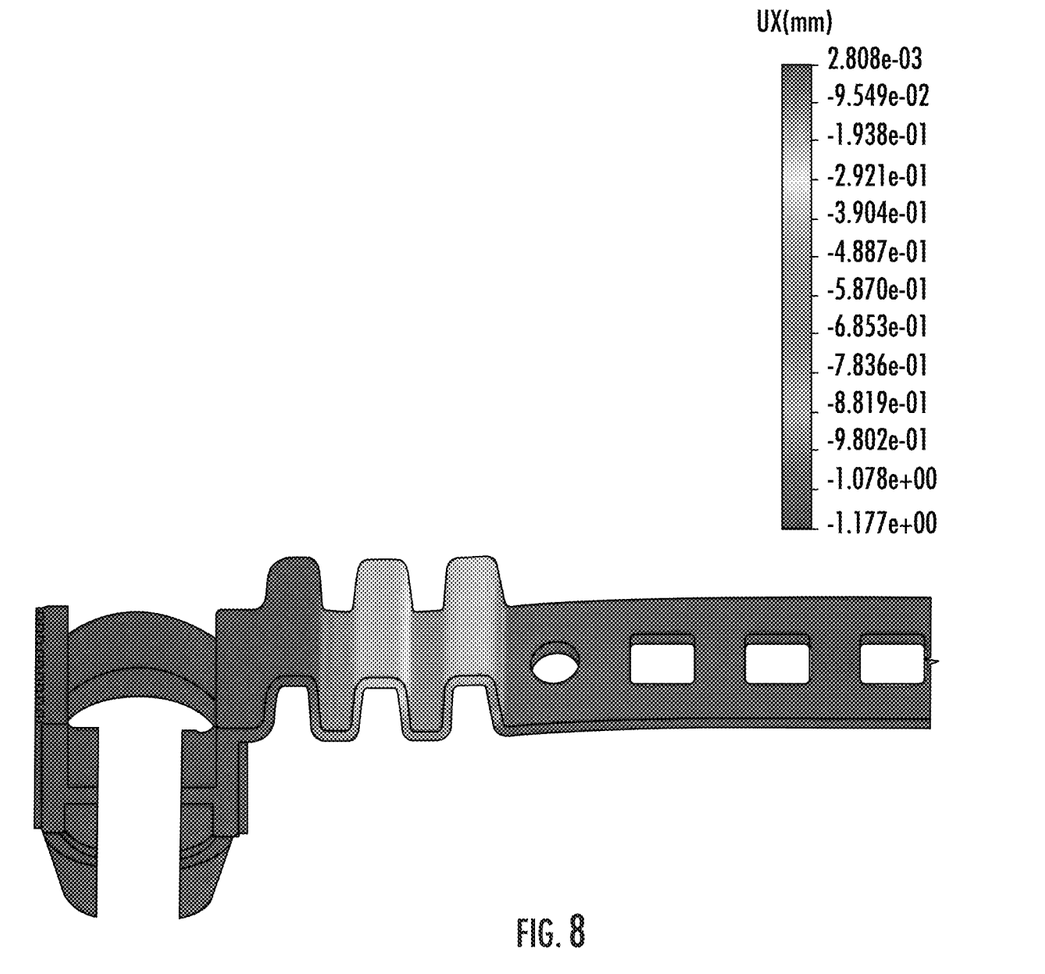
FIG. 8 is a plot illustrating elongation of the device of FIG. 1A under load modeling.
Figure 9:
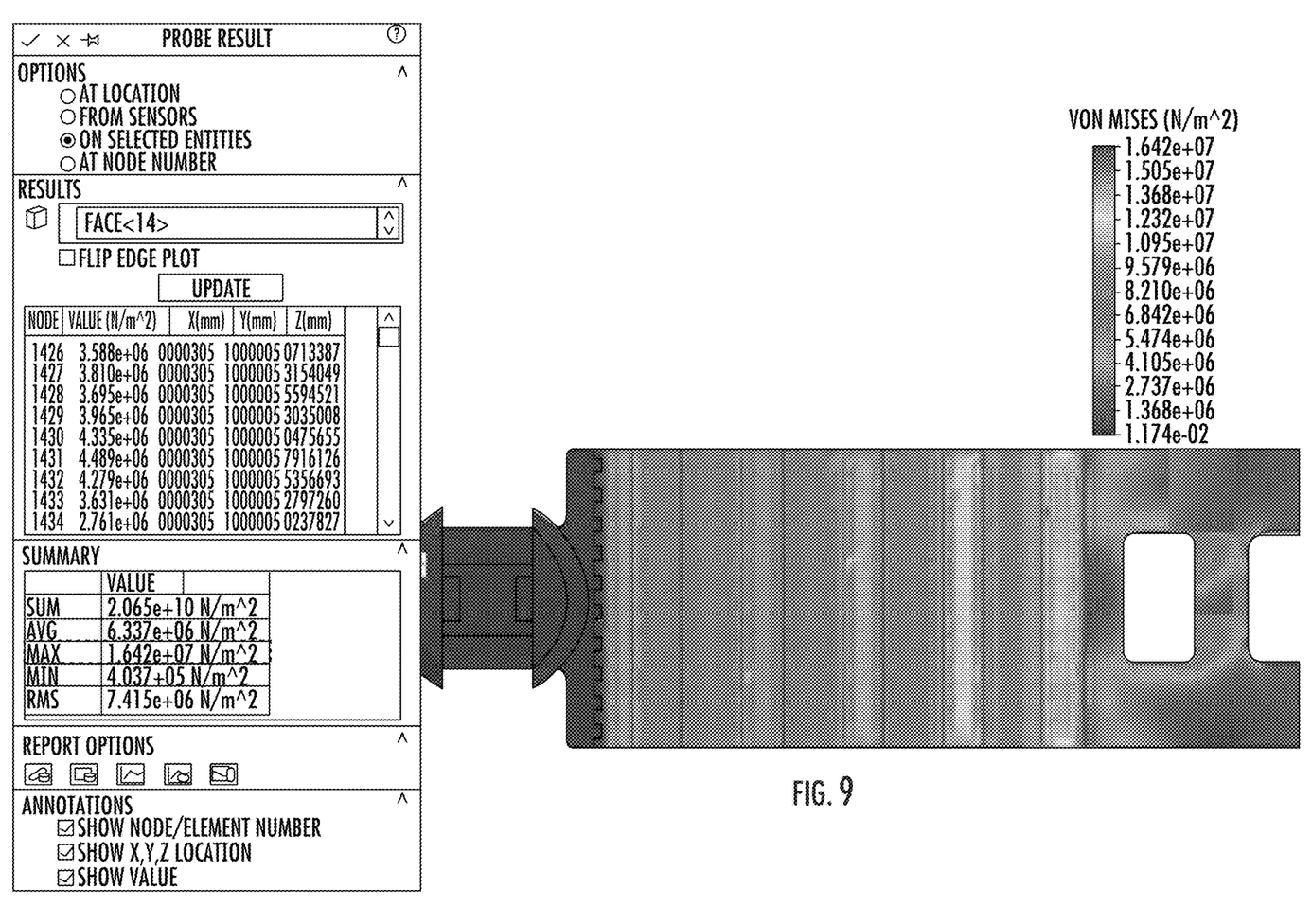
FIG. 9 is a plot illustrating stress of the device of FIG. 2 under load modeling.

FIG. 7 is a three-dimensional plot showing the elongation experienced by the device 100 (and in particular the elongation of the undulations 107a-e), while FIG. 8 is a corresponding three-dimensional plot showing the elongation experienced by the undulations 407 of the device 400). As can be seen in FIGS. 7 and 8, under the same load L, the device 100 is able to achieve elongation of between 2.5 to 4.0 times greater than that of the device 400.

Figure 10:
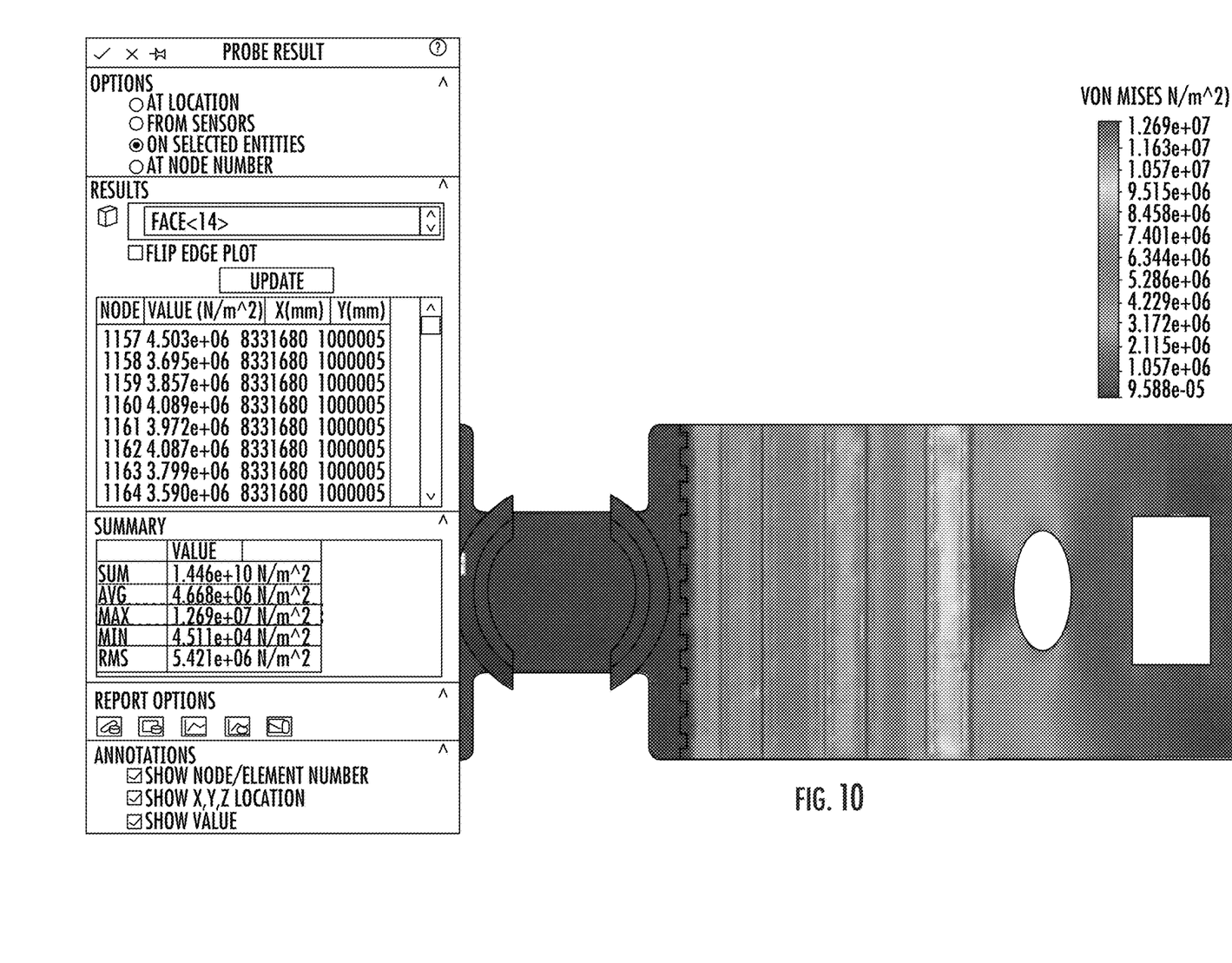
FIG. 10 is a plot illustrating stress of the device of FIG. 1A under load modeling.

As noted above, experimentation has shown that when the devices 100, 400 are wrapped around a bundle of cables, the first undulation (i.e., undulation 107a and its corresponding undulation 407 of the device 400) experiences the highest level of stress. To assess the distribution of stress across the undulations, a comparison can be made of the stress experienced by the ultimate undulation (farthest from the mounting portions 104, 404) vs. the adjacent penultimate undulation. (More specifically, this involves comparing the stress in undulation 107e vs. undulation 107d, and also comparing the stress in the corresponding ultimate and penultimate undulations of the device 400). As seen in FIG. 10, in the device 400, maximum Von Mises stress in the ultimate undulation is about 32% higher than the penultimate undulation. However, in the device 100, the maximum Von Mises stress in the ultimate undulation 107e is about 26% higher than the penultimate undulation 107d (see FIG. 9). This shows a stress distribution that is more uniform, and the device 100 is less likely to crack than the device 400, even with significantly increased elongation under load.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A device adapted for holding one or more discrete cables, comprising:
   a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion;
   a securing feature attached to or integral with the mounting portion of the main body and configured to be received by an aperture in a mounting structure to secure the device to the mounting structure; and
   a plurality of apertures along the longitudinal axis of the wrapping portion of the main body,
   wherein the securing feature is configured to be received through one of the plurality of apertures when the main body is wrapped around the one or more discrete cables; and
   wherein at least one of the undulations varies in at least one of height, width and thickness from at least one of the other undulations.

2. The device defined in claim 1, wherein a first undulation of the plurality of undulations is immediately adjacent the mounting portion, and wherein the at least one of the undulations that varies in at least one of the height, width and thickness is the first undulation.

3. The device defined in claim 2, wherein the first undulation varies in height from at least one of the other undulations.

4. The device defined in claim 2, wherein the first undulation varies in width from at least one of the other undulations.

5. The device defined in claim 2, wherein the first undulation varies in thickness from at least one of the other undulations.

6. The device defined in claim 1, wherein the device is formed of a polymeric material.

7. The device defined in claim 1, wherein the main body is wrapped around the one or more discrete cables and the securing feature is received through one of the plurality of apertures, thereby holding the one or more discrete cables.

8. A device adapted for holding one or more discrete cables, comprising:
- a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion;
- a securing feature attached to or integral with the mounting portion of the main body and configured to be received by an aperture in a mounting structure to secure the device to the mounting structure; and
- a plurality of apertures along the longitudinal axis of the wrapping portion of the main body,
- wherein the securing feature is configured to be received through one of the plurality of apertures when the main body is wrapped around the one or more discrete cables; and
- wherein a first undulation of the plurality of undulations is immediately adjacent to the mounting portion, and wherein the first undulation varies in height and width from at least one of the other undulations.

9. The device defined in claim 8, wherein a second one of the plurality of undulations is immediately adjacent the first undulation, and wherein the second undulation has a greater height than the first undulation.

10. The device defined in claim 9, wherein the first undulation includes a section that has a greater thickness than the second undulation.

11. The device defined in claim 9, wherein a third one of the plurality of undulations has a height greater than the first and second undulations.

12. The device defined in claim 8, wherein the device is formed of a polymeric material.

13. The device defined in claim 8, wherein the main body is wrapped around the one or more discrete cables and the securing feature is received through one of the plurality of apertures, thereby holding the one or more discrete cables.

14. A device adapted for holding one or more discrete cables, comprising:
- a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables, and wherein a plurality of undulations are present between the mounting portion and the wrapping portion;
- a securing feature attached to or integral with the mounting portion of the main body and configured to be secured to be received by an aperture in a mounting structure; and
- a plurality of apertures along the longitudinal axis of the wrapping portion of the main body,
- wherein the securing feature is configured to be received through one of the plurality of apertures when the main body is wrapped around the one or more discrete cables; and
- wherein a first undulation of the plurality of undulations is immediately adjacent to the mounting portion and has a first height, a second undulation is immediately adjacent the first undulation and has a second height, and a third undulation is immediately adjacent the second undulation and has a third height, and wherein the third height is greater than the second height, and the second height is greater than the first height.

15. The device defined in claim 14, wherein the first undulation has a width that is greater than a width of the second undulation.

16. The device defined in claim 14, wherein the first undulation includes a section that has a greater thickness than the second undulation.

17. The device defined in claim 14, wherein the device is formed of a polymeric material.

18. The device defined in claim 14, wherein the main body is wrapped around the one or more discrete cables and the securing feature is received through one of the plurality of apertures, thereby holding the one or more discrete cables.

* * * * *